Sept. 16, 1969  C. W. VOGT  3,467,151
PACKAGING APPARATUS AND FLOW CONTROL VALVE THEREFOR
Filed June 16, 1964  4 Sheets-Sheet 1
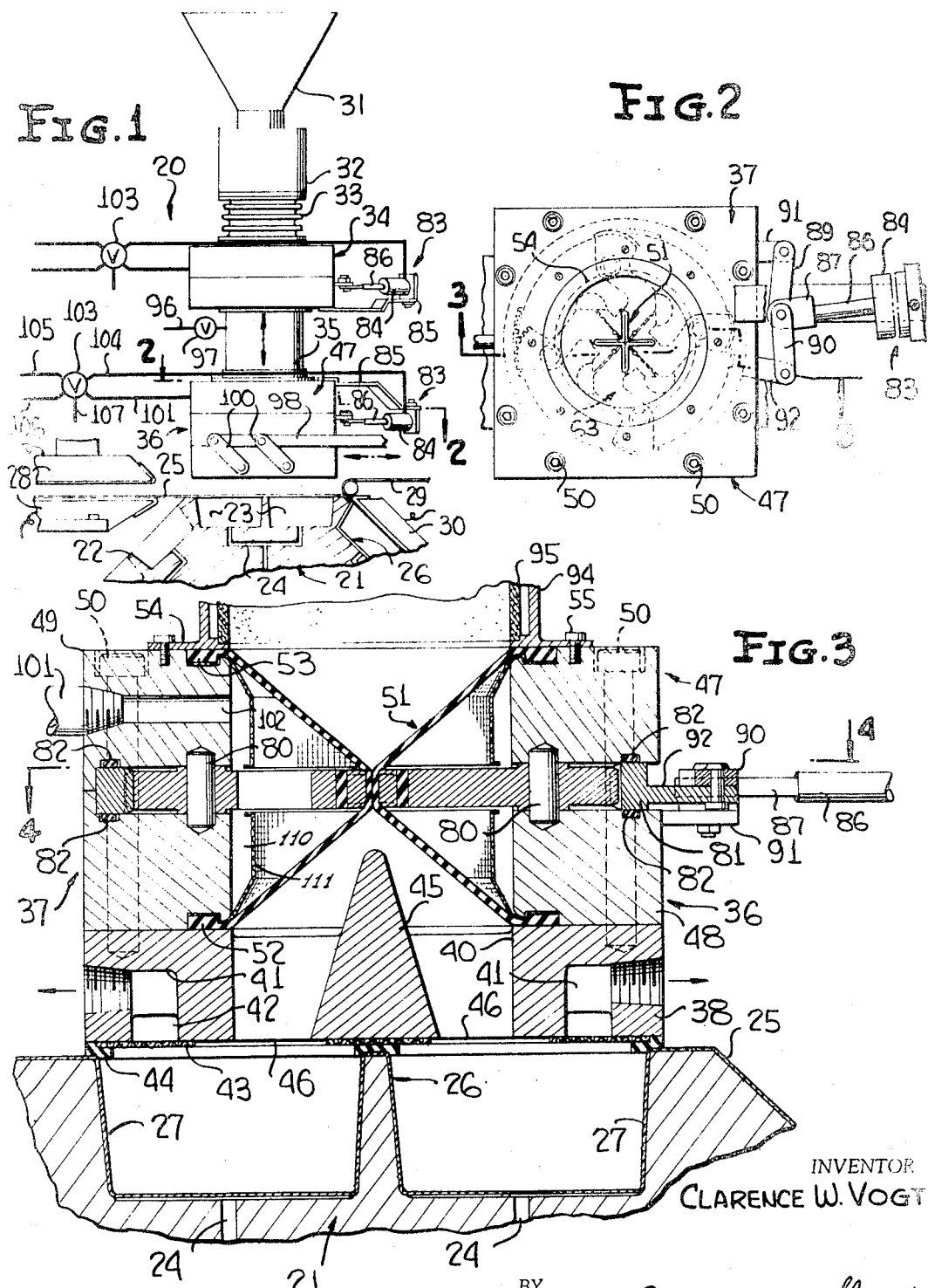

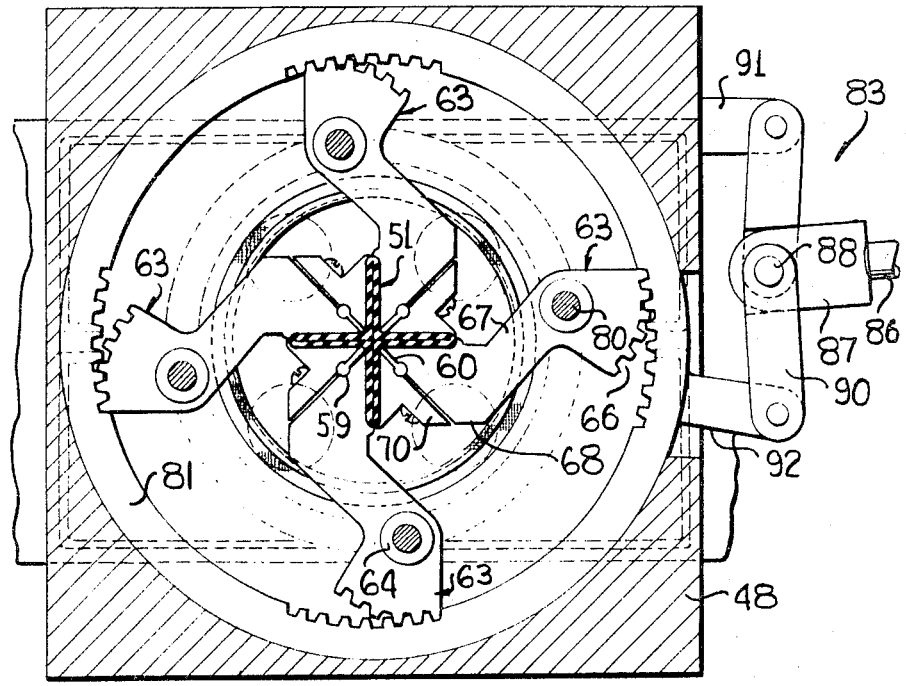
FIG.4
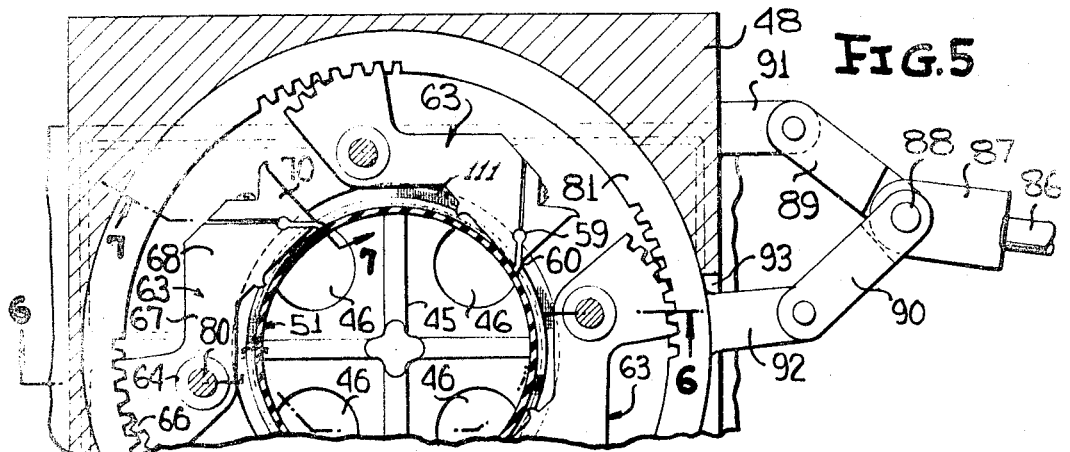
FIG.5
FIG.6
INVENTOR
CLARENCE W. VOGT

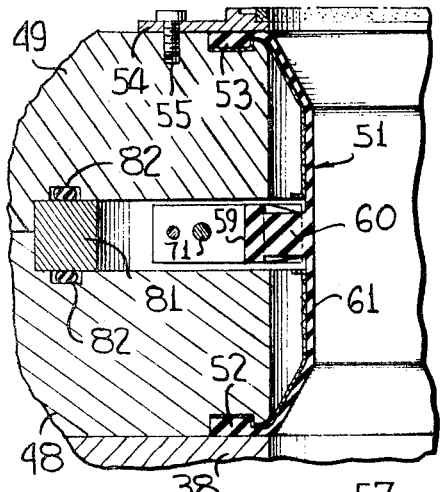
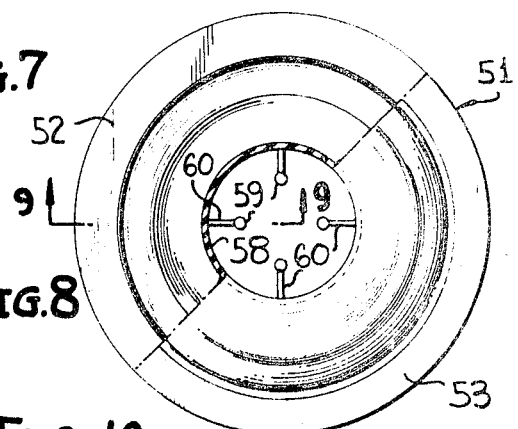
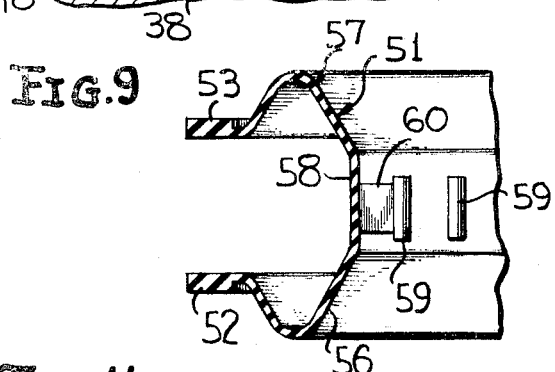
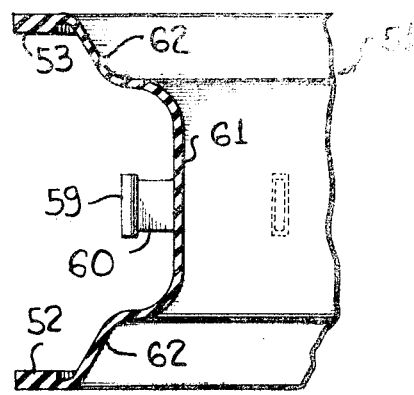
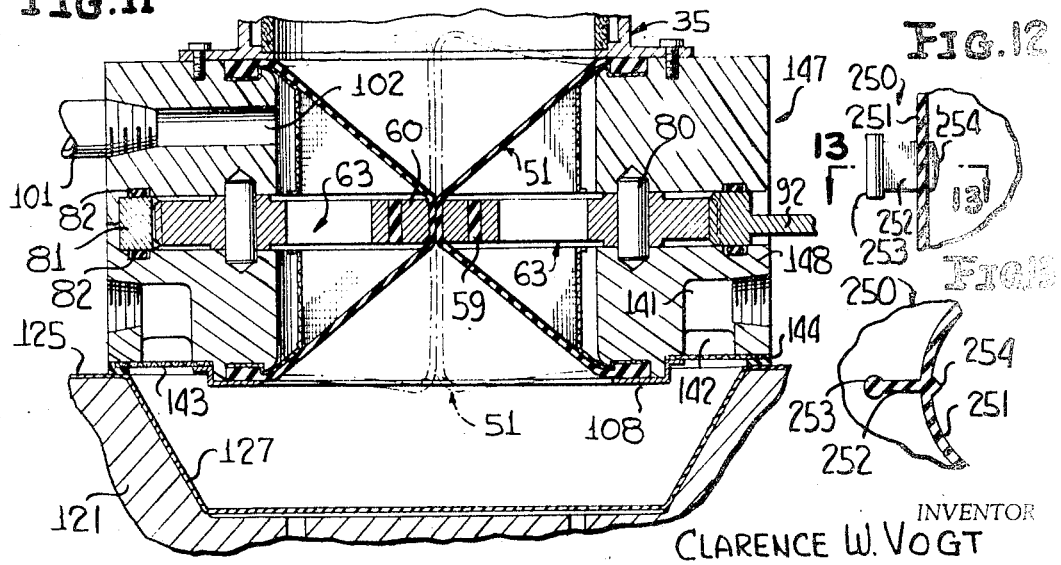

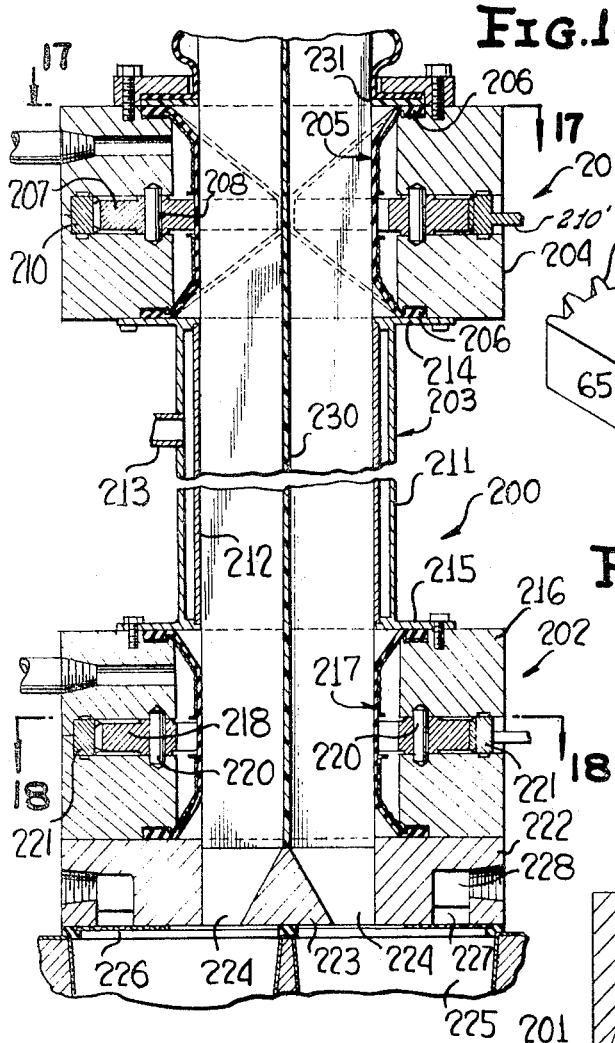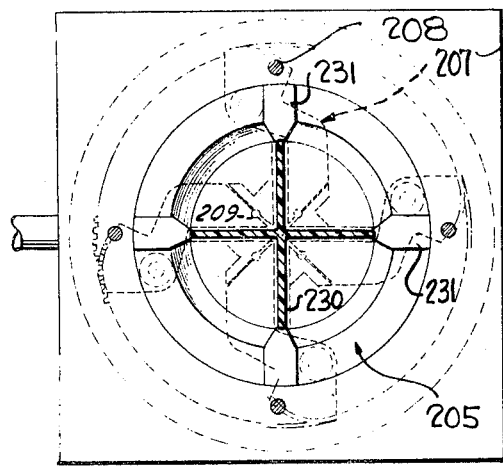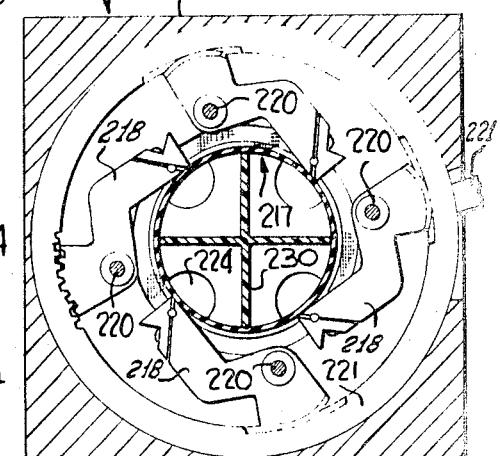

United States Patent Office 3,467,151
Patented Sept. 16, 1969

3,467,151
PACKAGING APPARATUS AND FLOW
CONTROL VALVE THEREFOR
Clarence W. Vogt, Box 232, Westport, Conn. 06880
Filed June 16, 1964, Ser. No. 375,441
Int. Cl. B65h 1/04, 1/30
U.S. Cl. 141—67         15 Claims This invention relates in general to new and useful improvements in the art of packaging materials, particularly powdery materials, and more particularly relates to a novel flow control valve.

A primary object of this invention is to provide a novel flow control valve which includes a resilient sleeve that is readily movable from an open position defining an enlarged substantially circular passage and a closed position wherein the inner surface has adjacent portions tightly clamped together to prevent any leakage therethrough.

Another object of this invention is to provide a novel quick acting flow control valve which is mechanically actuated and is therefore positive in the actuation thereof.

Another object of this invention is to provide a quick opening flow control valve for use as part of a filling machine, the valve including a flexible sleeve which has a normal open condition defining a central opening of a size less than the operating full open condition thereof, the valve sleeve having associated therewith arms which are secured to the sleeve at peripherally spaced positions and the arms being movable in unison towards one another and away from one another for moving the sleeve between an expanded open position and a squeezed closed position.

Still another object of this invention is to provide a novel valve sleeve which, when molded, defines a circular passage which is of a size lesser than the size of the intended opening of the valve sleeve during the operation thereof as part of a valve, the valve sleeve being folded in cross-section and containing sufficient material whereby it may be readily opened to define a much larger flow passage and at the same time is readily squeezable to a closed position without excessive stretching thereof, the deformation of the sleeve being substantially entirely by folding of the sleeve.

A further object of this invention is to provide a novel filling head which includes a housing having at the lower portion thereof means for forming a seal with the periphery of a container, and at the upper portion thereof a quick opening and closing valve in accordance with the foregoing, the housing also including a lower filter member adapted to overlie at least a portion of the container for permitting the free flow of gaseous fluids out of the container while retaining powdery material therein whereby the filling head may be utilized in a differential pressure gaseous filling operation in conjunction with flowable solids.

Another object of this invention is to provide a novel filling head in accordance with the foregoing object wherein a flow divider is mounted in the housing below the valve whereby a flowable solid passing through the valve may be equally distributed to a plurality of underlying containers.

Still another object of this invention is provide a novel filling head in accordance with the foregoing object wherein the valve includes a resilient sleeve which is actuated by the mechanically controlled arms, and the arms are mounted for swinging at an angle to the axis of the path of flow through the valve whereby the lower portion of the valve sleeve is forced downwardly towards the underlying container so as to effect a mechanical compaction of the material placed within the container.

A still further object of this invention is to provide a novel filling apparatus for filling a plurality of containers of a container unit in the manner wherein the amount of material placed within each container unit may be accurately controlled while the amount of material placed in each individual container of the container unit is substantially, but not necessarily, equal, the apparatus including a weighing mechanism for weighing a predetermined amount of material, and a filling head for filling a plural container unit utilizing a pressure differential gaseous flow principle and with the filling head including a flow divider for dividing the flow of the weighed material substantially equally to the various containers of the container unit.

Yet another object of this invention is to provide a novel quick acting flow control valve which includes a resilient sleeve and a plurality of arms which are mounted for swinging movement and which are attached to the sleeve at peripheral spaced points, each of the arms having a gear segment and there being provided a single ring gear which, when rotated, will simultaneously actuate all of the arms for moving the arms between a valve open position and a valve closed position aided by differential gaseous pressures alternately applied.

With the above and other objects in view that will hereinafter appear, the nature of the invention will be more clearly understood by reference to the following detailed description, the appended claims and the several views illustrated in the accompanying drawings.

In the drawings:

FIGURE 1 is a schematic elevational view with parts broken away and shown in section of an automatic filling machine formed in accordance with this invention.

FIGURE 2 is a fragmentary horizontal sectional view taken along line 2—2 of FIGURE 1 and shows generally the details of the flow control valve of the filling mechanism.

FIGURE 3 is an enlarged fragmentary vertical sectional view taken along line 3—3 of FIGURE 2 and shows more specifically the details of the filling head of the filling mechanism including the details of the flow control valve.

FIGURE 4 is an enlarged fragmentary horizontal sectional view taken along line 4—4 of FIGURE 3 and shows specifically the details of the flow control valve in its closed position.

FIGURE 5 is a fragmentary enlarged horizontal sectional view showing the flow control valve in its fully open position.

FIGURE 6 is an enlarged fragmentary vertical sectional view taken along line 6—6 of FIGURE 5 and shows the specific cross-section of the valve sleeve in the fully open position thereof.

FIGURE 7 is an enlarged fragmentary vertical sectional view taken along line 7—7 of FIGURE 5 and shows the specific manner in which the valve sleeve is secured to one of the control arms.

FIGURE 8 is a plan view with portions broken way and shown in section of the valve sleeve in its molded state.

FIGURE 9 is an enlarged fragmentary vertical sectional view taken along line 9—9 of FIGURE 8, and shows the specific cross section of the valve sleeve in its molded state.

FIGURE 10 is an enlarged fragmentary vertical sectional view similar to FIGURE 9 and shows the valve sleeve after it has been turned inside out and is ready for use.

FIGURE 11 is an enlarged fragmentary vertical sectional view similar to FIGURE 3 and shows a modified form of filling head utilizing the flow control valve.

FIGURE 12 is an enlarged fragmentary vertical sectional view taken through the center portion of a slightly modified form of valve sleeve to ensure the sealing of the valve sleeve in its closed position.

FIGURE 13 is a fragmentary horizontal sectional view taken along the line 13—13 of FIGURE 12 and shows further the cross section of the valve sleeve of FIGURE 12.

FIGURE 14 is an enlarged exploded perspective view showing the details of one of the control arms and the means for attaching the valve sleeve thereto.

FIGURE 15 is an enlarged fragmentary plan view with portions broken away and shown in section and shows the manner in which the valve sleeve is clamped in place with respect to one of the control arms.

FIGURE 16 is a vertical sectional view taken through a modified form of valve mechanism and shows the specific details thereof.

FIGURE 17 is a fragmentary horizontal sectional view taken along the line 17—17 of FIGURE 16 and shows the specific details of one part of the valve in its open position.

FIGURE 18 is a horizontal sectional view taken along the line 18—18 of FIGURE 16 and shows the specific details of the means for moving a valve sleeve between an open position and a closed position.

Referring now to the drawings in detail, it will be seen that there is illustrated in FIGURE 1 a filling apparatus formed in accordance with this invention. The filling apparatus is generally referred to by the numeral 20 and is constructed broadly along the lines of the filling apparatus disclosed in my Patent No. 2,949,713 granted Aug. 23, 1960. The filling apparatus 20 includes a multiple mold, generally referred to by the numeral 21, which is mounted for rotation and which is automatically indexed in a manner which is not part of this invention. The mold 21 is of a polygonal cross section and has a plurality of like faces 22. The mold 21 is recessed at each of the faces 22 to define a plurality of cavities 23. In the illustrated form of the invention, each face 22 has four like cavities therein. However, the number of cavities may be varied. Each of the cavities 23 has connected thereto a vacuum line 24 for the purpose of vacuum forming a portion of a continuous web 25 to define a container unit, which is generally referred to by the numeral 26. Each container unit 26 formed with the illustrated mold 21 includes four like readily separable containers 27, as is best shown in FIG. 3.

The container units 26 may be formed from any suitable type of material although plastic materials are preferred due to the fact that they may be readily vacuum formed. The web 25, prior to engaging the mold 21, passes between a pair of opposed heaters 28 so as to be heated to the necessary temperature for vacuum forming. Then after the web 25 overlies the uppermost face 22 of the mold 21, vacuum is drawn in the cavities 23 below the web 25 so as to draw the web 25 down into the cavities 23 and thus define a container unit 26 of the type clearly shown in FIGURE 3.

After the container unit 26 has been formed, the product to be packaged is placed within the individual containers 27 thereof. The mold 21 is then indexed in a clockwise direction and while being indexed, a cover web 29 is applied to the filled container unit 26. The cover web 29 is formed of a material which may be directly heat bonded to the web 25 or which is so coated whereby it may be heat bonded to the web 25. A heater 30 is provided for bonding the web 29 to the web 25 surrounding the individual filled containers 27. It is to be noted that the heater 30 is mounted for reciprocatory movement to provide for the necessary clearance of the mold 21 when the mold 21 is being indexed.

The above-described mold and the manner in which the container units are formed and closed do not form a material part of this invention, but are disclosed to merely set forth an environmental use of the filling apparatus.

The filling apparaus 20 includes a hopper 31 in which the product to be placed within the package units 26 is received. In accordance with this invention, it is preferred that the product be in the form of a flowable solid although this invention is not so restricted as to product.

Below the hopper 31 is an automatic weighing scale 32 of a conventional type. When actuated, the automatic weighing scale 32 will weigh out a predetermined amount of the product to be packaged and will release the same down through a bellows 33. Below the bellows 33 is a flow control valve which is generally referred to by the numeral 34. The flow control valve 34 controls the flow of the weighed product into a chamber 35 which is part of a filling head, generally referred to be the numeral 36. The filling head 36 is so constructed whereby it will effect the rapid filling of the individual containers 27 utilizing a gaseous type carrier for the product with the gaseous type carrier flowing due to a pressure differential. This pressure differential may be effected by either direct pressure, by vacuum, or by a combination of super atmospheric pressure and vacuum. The filling head 36 also functions to divide the measured charge of the porduct into four substantially equal amounts for delivery to each of the containers 27. It thus will be apparent that each of the containers 27 will contain approximately the same amount of the product and that each container unit 26 will contain exactly the same weight of the product although the weight of the product contained in each container 27 may vary slightly.

It is pointed out here that the filling apparatus 20 is intended to be utilized in packaging a product in small containers which are later packaged in a larger container and wherein only the total weight of the product within the larger container must be controlled. The number of individual containers 27 in each container unit is a aliquot of the number of individual containers which are to be packaged in the larger container. Thus, it will be readily apparent that accurate total weights can be obtained by measuring, for example, the total weight of the contents of four individual containers as opposed to measuring the weight of each individual container. By reducing the weighing operations to only 25% of that previously required, the filling operation may be greatly speeded up without loss of accuracy.

Referring now to FIGURE 3 in particular, it will be seen that the filling head 36 includes a housing which is generally referred to by the numeral 37. The housing 37 includes a lower housing section 38 which has a central flow passage 40 therethrough and which has a suitable vent passage arrangement 41 formed therein for venting gases, including air, from the individual containers 27 as they are being filled. Vent pipes (not shown) will be secured to the lower housing section 38 by means of threaded connections and venting will be either to the atmosphere or due to the application of vacuum. The vent passages 41 open through the underside of the housing section 38 and, if desired, the lower opening may be in the form of a ring like passage 42. The vent passage in the underside of the housing section 38 is closed by means of a suitable filter member 43 through which gases may readily pass and which is of such a fine mesh that the product being placed within the containers 27 will not pass therethrough. The filter 43 is clamped in place by means of a retaining ring 44 which is preferably formed of a resilient material whereby a seal may be formed between the underside of the housing 37 and the web 25 surrounding each of the containers 27.

The lower housing section 38 has also formed therein a divider 45 which is of a tapered cross section. The divider 45, since each container unit 26 is formed of four containers 27, is of a cruciform configuration. However, it will be understood that the outline of the flow divider 45 will vary in accordance with the number and arrangement of containers of each container unit. The flow divider 45 is so shaped and arranged with respect to the flow passage 40 whereby there is a circular flow passage 46 opening through the underside of the lower housing section 38 into each of the containers 27.

The filling head 36 also includes a flow control valve which is generally referred to by the numeral 47. The flow control valve 47 has a housing which in part of the housing 37 and includes a housing member 48 which directly overlies the lower housing section 38. A second housing member 49 overlies the housing member 48 and cooperates therewith in mounting the components of the valve 47. The housing members 48 and 49 are clamped together and to the housing section 38 by means of a plurality of spaced bolts 50.

The flow control valve 47 includes a valve sleeve 51 which is preferably formed of rubber and rubber-like products including neoprene so as to be both flexible and resilient. The valve sleeve 51 is provided at its lower end with an enlarged flange 52 and at its upper end with an enlarged flange 53. The underside of the housing member 48 is suitably recessed to receive the flange 52 and the flange 52 is clamped between the housing member 48 and the housing section 38. The upper surface of the housing member 49 is suitably recessed to receive the flange 53 and an upper adapter ring 54, which is secured to the upper surface of the housing member 49 by a plurality of fasteners 55, clamps the flange 53 against the housing member 49.

Reference is now made to FIGURES 8 and 9 wherein the details of the valve sleeve 51 in the normal molded condition of the valve sleeve are illustrated. The valve sleeve 51 has a lower generally U-shaped portion 56 connected directly to the thickened flange 52. A similar, but inverted U-shaped portion 57 is connected to the thickened flange 53. The U-shaped portions 56 and 57 are connected together by a straight line portion 58. The straight line portion 58 is provided on the inner face thereof with a plurality of inwardly projecting tabs 60 which are circumferentially spaced and which correspond in number to the number of associated support arms which will be described hereinafter. Each tab 60 has an enlargement 59 at the inner end thereof.

It is to be noted from FIGURE 9 that when the valve sleeve 51 is initially molded, it is relatively short and the tabs 60 project inwardly from the straight line portion 58. However, after molding and prior to the use of the valve sleeve, the valve sleeve is turned inside out so that it appears as is shown in FIGURE 10. The valve sleeve 51 is now folded in section and has a relatively long straight line portion 61 which is connected to the flanges 52 and 53 by generally S-shaped portion 62. It is to be noted that the tabs 60 are now outwardly directed as opposed to their originally inwardly directed positions.

As is clearly illustrated in FIGURES 3 and 6, during the normal use of the valve 47, the valve sleeve 51 is either in a fully closed position or a fully opened position and normally does not remain in its reversely turned molded position. In order to effect the movement of the valve sleeve 51 between a closed position and an open position, an actuator is provided. The actuator includes a plurality of arms which are identical and each of which arms is generally referred to by the numeral 63. Each arm 63, as is best illustrated in FIGURE 14, includes a bearing sleeve portion 64 having a bore 65 therethrough. A gear segment 66 extends in one direction from the bearing sleeve portion 64 with the center of the bore 65 being the center of rotation of the gear segment.

A short arm 67 extends from the opposite side of the bearing sleeve portion 64 in angular relation to the gear segment 66. The arm 67 terminates in an inner arm 68 which is disposed generally parallel to the projecting part carrying the gear segment 66.

In order to facilitate the securement of the valve sleeve 51 to an arm 63, the outer end of the arm portion 68 is provided with an upstanding groove 69. Also, the arm portion 68 has removably secured thereto an arm extension 70 by means of a fastener 71. The arm extension 70 has an upstanding groove 72 which matches the groove 69. As is clearly illustrated in FIGURE 5, when the arm extension 70 is secured to the arm portion 68 by means if the fastener 71, the tab 60 and the associated enlargement 59 are clamped between the arm portion 68 and the arm extension 70 to rigidly secure the valve sleeve 51 to the arm 63.

It is to be noted that the arm portion 68 has a valve sleeve clamping face 73 generally on the arm 67 side thereof. The arm extension 70 has a similar clamping face 74 which is disposed at right angles to the sleeve clamping face 73. The arm portion 68 has an outwardly projecting, upstanding rib 75 defining the outer edge of the face 73. The rib 75 has a generally quarter-circle face 76 which cooperates with the face 73. In a like manner, the face 74 terminates in an upstanding rib 77 at the end thereof remote from the face 73. The rib 77 has a quarter-circle face 78 which cooperates with the face 74. The functions of the faces 73, 74, 76 and 78 will be described in detail hereinafter.

Referring now to FIGURES 3 and 4 in particular, it will be seen that each of the arms 63 is mounted for pivotal movement on a pivot pin 80 which is supported by the two housing members 48 and 49. An internal ring gear 81 is suitably mounted within the housing members 48 and 49 in meshing engagement with the gear segments 66. Thus, when the ring gear 81 is rotated, all of the arms 63 will be swung in unison.

Referring now to FIGURES 5 and 6 in particular, it will be seen that when the ring gear 81 has been rotated in a counterclockwise direction, the arms 63 are swung outwardly to positions wherein a desired opening of the valve sleeve 51 occurs. In this position of the valve sleeve 51, the S-shaped portions 62 have changed their configurations so that they are generally continuations of the straight portions 58 although they may be slightly angular in outline.

When the ring gear 81 is rotated in a clockwise direction, the arms 63 are swung together and a transverse cross section through the center of the valve sleeve 51 changes from circular to cruciform, as is shown in FIGURE 4. At the same time, a vertical section through the valve sleeve 51 changes to a generally horizontal V-cross section, as is shown in FIGURE 3. This assures a complete sealing of the valve sleeve 51 against the flow of both solids and gases therethrough. It is to be noted that the particular configurations of the arms 63, particularly the faces 73, 74, 76 and 78 thereof, provide for the snug reception of the folded central portions of the valve sleeve 51. It is also to be noted that the folded portions of the valve sleeve 51 which are of a cruciform arrangement are aligned with the flow divider 45. Thus, when the ring gear 81 is again rotated in a counterclockwise direction and the arms 63 are swung apart, the opening of the valve sleeve 51 will be equal with respect to the flow passage portions defined by the flow divider 45 and even the initial flow of material through the valve sleeve 51 will be equally divided for passage into the individual containers 27.

At this time it is pointed out that due to angular configuration of each of the arms 63, the central portion of the valve sleeve 51 is gradually folded towards its cruciform configuration but at the same time it is free to fold in that there is no gripping whatsover of the valve sleeve 51 by the faces of the arms 63 until the valve sleeve has substantially reached its cruciform configuration of FIGURE 4. If the arms 63 were straight as opposed to being generally S-shaped in outline, there would be a gradual pinching of the valve sleeve 51 and the freedom of folding of the valve sleeve would not exist. As a result, undue frictional forces would be set up between the valve sleeve and the arms which would prevent the proper folding of the valve sleeve.

At this time it is also pointed out that the space within the valve members 48 and 49 between the ring gear 81 and the valve sleeve 51 may be sealed by mounting within the housing members 48 and 49 sealing rings 82 which bear against and form sealing contacts with the ring gear 81. The purpose of this sealing will be described in more detail hereinafter.

The rotation of the ring gear 81 is controlled by an actuator which is generally referred to by the numeral 83. The actuator 83 includes a fluid motor 84 (FIGURE 1) which is pivotally supported relative to the valve 47 by means of a bracket 85. The fluid motor 84 includes a piston rod 86 which is provided at the forward end thereof with a fitting 87 carrying a pivot pin 88. The pivot pin 88 has pivotally mounted thereon two links 89 and 90. The link 89 is pivotally connected to an ear 91 carried by one of the housing members 48 and 49 while the link 90 is pivotally connected to an arm 92 rigidly carried by the ring gear 81 and projecting through an opening 93 between the housing members 48 and 49. It is to be noted that the links 89 and 90 form a toggle arrangement and in the closed position of the valve sleeve 51 (FIGURE 4), they have been moved to a slightly over center position to provide a positive lock.

The flow control valve 34 may be of the same construction as the flow control valve 47 and is provided with a similar actuator 83. However, if desired, the flow control valve 34 could be of a different construction.

Referring once again to FIGURE 3, it will be seen that the chamber 35 is defined by an outer casing 94 in which there is sealed a porous liner 95 which is spaced inwardly of the casing 94. The lower end of the casing 94 is suitably secured to the ring 54. In FIGURE 1 it is shown that the casing 94 has a fluid line 96 connected thereto and that flow of fluid through the line 96 is controlled by means of a valve 97.

It is to be understood that the flow control valve 34, the chamber 35 and the filling head 36 will be vertically reciprocated in timed relation to the indexing of the mold 21. The vertical reciprocation of these components may be obtained in any desired manner and is schematically illustrated as being effected by means of a horizontally reciprocating rod 98 which is vertically fixed and which is connected to the housing 37 by means of a pair of links 100.

Operation

It is to be understood that when the filling apparatus 20 is in the position shown in FIGURE 1, a predetermined amount of the material has already been weighed and released by the weighing mechanism 32 and dropped into the chamber 35. As the filling head 36 is moved downwardly, vacuum is drawn to form the container unit 26 from the web 25. As soon as the housing 37 is sealed with respect to the container unit 26, and with the flow control valve 34 in a closed position, the valve 47 is opened. At this time, or slightly prior thereto, if filling is by means of vacuum alone, vacuum is drawn through the vent ports 41 and air is permitted to flow through the line 96 into the chamber 35. This pressure differential will cause a rush of air down through the flow control valve 47 carrying the flowable product therewith down into the individual containers 27 with the flow of the material being equally divided by the flow divider 45. The filter 43 serves to prevent the material from being removed from the containers 27 through the vent openings 41.

Should the pressure differential be desired to be formed without the use of a vacuum, then the vent openings 41 may be vented to the atmosphere, and air or other gases under super-atmospheric pressure may be delivered into the chamber 35 through the line 96. On the other hand, a combination of pressure within the chamber 35 and a vacuum within the containers 27 may be utilized. It is to be understood that the use of a differential gaseous pressure filling apparatus will result in instantaneous filling of the containers 27 so as to greatly reduce the time of the filling operation. Also, it is to be understood that the product will be compacted within the containers 27 in that substantially all of the air or other gases have been removed therefrom so that it is possible, when desired, to place a larger quantity of a given product within one of the containers 27.

After the filling of the containers 27 of the one container unit 26 has been accomplished, the filling head 36 is elevated and the mold 21 is indexed. At this time, the cover web 29 is applied to the filled container unit 26. In subsequent operations, the filled container units 26 may be severed from the webs 25 and 29, and if desired, the individual containers 26 may be severed from one another by means of a suitable knife unit such as that illustrated in my above-mentioned Patent 2,949,713.

While the filling of the container unit 26 has been taking place, the automatic weighing mechanism 32 will have weighed another charge of the material and when the flow control valve 47 is closed, the flow control valve 34 may be opened to again charge the chamber 35 with a measured charge of material. It is to be understood that on the downstroke of the filling head 36 and prior to the opening of the flow control valve 47, the flow control valve 34 will be opened. It is also pointed out that the bellows 33 permit the relative vertical reciprocation of the flow control valve 34 with respect to the weighing mechanism 32.

At this time it is pointed out that while a gaseous pressure differential filling operation is preferred, due to the fact that it is much faster than gravity feed, and compaction of the material does occur, it is feasible to eliminate the flow control valve 34 and the chamber 35 with flow from the weighing mechanism 32 through the filling head 36 and into the container unit 26 being accomplished solely by gravity.

The purpose of the sealing rings 82 will now be set forth in detail. It is to be noted that each of the flow control valves 34 and 47 have connected thereto a valve control line 101 which is connected to sources of vacuum and super-atmospheric pressure. The line 101 leads into the space 110 sealed off by the sealing rings 82 through a port 102. The movement of the valve sleeve 51 can be greatly facilitated by drawing a vacuum in the space 110 and the desired shaping of the valve sleeve can be obtained by surrounding the valve sleeve with a shape defining screen 111. A more positive sealing closed of the valve sleeve 51 is obtained by introducing air under pressure in the space 110. It is also pointed out that the use of both a vacuum and pressure greatly reduces the load in the actuator 83 and increases the speed of operation.

Referring now to FIGURE 1 once again, it will be seen that the line 101 is connected to a flow control valve 103. Another line 104 extends between the valve 103 and the fluid cylinder 84. The valve 103 also has connected thereto an air supply line 105 and a vacuum line 106. The valve 103 further has connected thereto a vent line 107. It is to be understood that the valve 103 is of a conventional construction and therefore, the structural details of the valve 103 will not be described here although the function of the valve will be described.

Assuming the valve 103 to be in a position wherein the valve sleeve 51 is fully closed, as is shown in FIGURE 3, and is retained in this fully closed position by air pressure surrounding the same, the valve 103 is then shifted to an opposite position and in shifting from the opposite position, the valve 103 first supplies a vacuum through the line 104 to the fluid motor 84 to retract the piston rod 86 from the position shown in FIGURE 4 to the position shown in FIGURE 5. Immediately upon the shifting of the valve 103, the line 101 is vented to the atmosphere through the vent line 107 so as to relieve the pressure around the valve sleeve 51. The space surrounding the valve sleeve 51 is vented to the atmosphere until the valve sleeve 51 reaches at least its normal position such as that shown in FIGURE 10. Then as the valve sleeve 51 is further opened by the continued swinging of the arms 63, the valve 103 shifts to a further position wherein a vacuum is drawn through the line 101 with the result that a vacuum is drawn in the space surrounding the valve sleeve 51 and aids in the opening thereof.

When it is desired to move the valve sleeve 51 from its fully opened position of FIGURES 5 and 6 to the closed position of FIGURES 3 and 4, the valve 103 is again actuated with the result that in the initial movement thereof pressure is directed to the fluid motor 85 through the air line 104 while air is permitted to freely flow into the space surrounding the valve sleeve 51 through the vent line 107 and the line 101. As the valve sleeve 51 approaches its fully closed position, the valve 103 moves to a further position wherein pressure is directed through the line 101 to aid in the sealing of the valve sleeve 51 by placing an external pressure thereon.

It is to be noted that the flow control valve 34 is provided with a similar type of control which also includes a valve 103.

It is to be understood that the flow control valve 47 may be utilized independently of the weighing device 32 and the bottom housing section 38 including the flow divider 45. In view of this, reference is made to FIGURE 11 wherein it will be seen that the flow control valve 47 is provided with a modified form of lower housing member 148. The lower housing member 148 is provided with one or more suitable vent passages 141 which open into a vent passage 142. A filter ring 143 underlies the vent passages 141 and is clamped in place by a clamp ring 108 and a resilient ring 144. The clamp ring 108 also clamps the thickened lower flange 52 of the valve sleeve 51 in place against the housing member 148. The thickened upper flange 53 is clamped in place against the housing member 49 by the ring 54 to which there is attached the chamber 35. If desired, the upper end of the chamber 35 may be closed by the flow control valve 34.

The filling apparatus illustrated in FIGURE 11 functions to fill an associated container 127 to capacity. After the container 127 has been shaped within a mold 121 from a web 125, the valve sleeve 51 is quickly opened and due to gas flow down through the valve sleeve 51 resulting from a pressure differential, a flowable solid disposed above the valve sleeve 51 will be immediately forced into the container 127 until it backs up against the filter 143, the clamp ring 108 and within the valve sleeve 51. The valve sleeve 51 is then moved to the closed position shown in FIGURE 11 with a resultant partial compacting of the material within the container 127 and an upward lifting of the material above the valve sleeve 51. If desired, a further compaction of the material within the container 127 can be obtained by applying additional pressure within the sealed area of the flow control valve 47 which will effect a stretching and swelling of the valve sleeve 51 to the phantom line position shown in FIGURE 11.

Reference is now made to FIGURES 16, 17 and 18, wherein there is illustrated another form of valve assembly which is generally referred to by the numeral 200. The valve assembly 200 includes an upper valve assembly 201 and a lower valve unit 202. The valve units 201 and 202 are connected together by a chamber 203. The valve units 201 and 202 correspond generally to the valves described hereinabove.

The valve unit 201 includes a multi-piece housing 204 in which there is mounted a valve sleeve 205, the valve sleeve 205 corresponding to the valve sleeve 51 and having upper and lower mounting flanges 206 which are suitably clamped to the housing 204. The housing 204 carries a plurality of valve actuating arms 207 which are mounted on pivot pins 208, the valve actuating arms 207 corresponding to the valve actuating arms 63 and being of a similar construction. The valve actuating arms 207 are connected to the valve sleeve 205 by means of tabs 209 which project from the exterior surface of the valve sleeve 205, as is best shown in FIGURE 18. The housing 204 also carries a ring gear 210 which is oscillated by means of an arm 210' to effect the controlled swinging of the valve actuating arms 207 between a valve closing position and a valve opening position. The manner in which the ring gear 210 is oscillated may be that described above with respect to the filler head 36.

It is to be noted that the chamber 203 includes an outer shell 211 and an inner porous sleeve 212. The sleeve 211 has a pipe fitting 213 connected thereto whereby air flow into and out of the chamber 203 may be controlled. The sleeve 211 is provided at its upper end with a mounting flange 214 which is secured to the underside of the housing 204. The lower end of the sleeve 211 is provided with a flange 215 which is secured to a housing 216 of the valve unit 202.

It is to be noted that the valve unit 202 is identical with the valve unit 201 and in addition to the housing 216, the valve unit 202 includes a valve sleeve 217, a plurality of valve actuating arms 218 which are secured to the valve sleeve 217 and which are mounted for pivotal movement on a plurality of pivot pins 220, and a ring gear 221 which is oscillated by means of an arm 221' for moving the arms 218 between a valve opening position and a valve closing position.

The valve units 201 and 202 will be provided with control means of the type described above with respect to the filler head 36. However, if desired, a single type of valve may be provided for simultaneously actuating the two valve units 201 and 202. Normally, when the valve unit 202 is in its closed position, the valve unit 201 will be in its open position, and vice versa.

If desired, the valve assembly 200 may be utilized for flow control purposes only and can be used as a replacement for the valve assembly of my Patent No. 3,058,498, granted Oct. 16, 1962. However, it is primarily intended for use as part of a filling unit, and as a result, there is secured to the underside of the housing 216 an adaptor plate 222 for filling a plurality of containers simultaneously. The adaptor plate 222 illustrated in the drawings is particularly adapted for use with four containers and is provided with a central divider 223 of a wedge shaped configuration. The divider 223 directs the flow through the adaptor plate 222 into one of a plurality of openings 224 which lead into individual containers 225. The containers 225 can be formed in any manner including the manner illustrated in FIGURE 1.

The adaptor plate 222 has a filter 226 secured to the underside thereof in any desired manner. The filter 226 underlies a vent passage 227 which is ring like and which overlies all of the containers 225. One or more vent ports 228 is formed in the adaptor member 222 and is adapted to have a vent pipe (not shown) connected thereto.

The valve assembly 200 is also provided with a flow divider 230. The flow divider 230 has a cross sectional configuration in accordance with the number of containers to be simultaneously filled. The illustrated flow divider 230 is of a cruciform configuration in view of the fact that four containers 225 are to be simultaneously filled. It is to be noted that the flow divider 230 extends upwardly from the adaptor plate 222 through the valve unit 202, the chamber 203 and the valve unit 201. The flow divider 230 may be supported entirely by the adaptor plate 222 and its frictional engagement with the porous sleeve 212. On the other hand, the upper portion thereof may be supported by means of a support plate 231 which is clamped against the upper flange 206 of the valve sleeve 205.

It is preferred that the valve assembly 200 be utilized in conjunction with a suitable automatic scale, such as the scale 32. However, as far as the operation of the valve assembly 200 is concerned, the manner in which flowable solid material enters into the upper portion of the valve assembly 200 is immaterial.

Reference is now made to FIGURES 12 and 13 wherein there is illustrated a slightly modified form of valve sleeve which is referred to by the numeral 250. The valve sleeve 250 has a straight line central portion 251 from which a plurality of tabs 252 extend. The tabs 252 correspond to the tabs 60 and have enlarged outer end portions 253 to facilitate the anchoring of the valve sleeve 250. It is to be noted that the valve sleeve 250 differs from the valve sleeve 51 in that on the inner face of the straight line portion 251 there are provided small projections 254. The projections 254 are aligned with the tabs 252 and are of a right triangular cross section. It is also to be noted that the projections 254 are slightly arcuate in outline, as is best shown in FIGURE 12.

It will be readily apparent from FIGURE 13 that the projections 254 reinforce the valve sleeve 251 at the point of connection of each tab 252 to the straight line portion 251 of the valve sleeve 250. However, a more beneficial effect is that when the valve sleeve 250 is brought to its closed position, such as that shown in FIGURE 11, for example, the projections 254 will all engage with one another and provide inter-engaging corner constructions to assure the formation of a seal.

It is also particularly pointed out that the valve sleeve 250 may well be used in the valve assembly 200. It will be readily apparent that the projections 254 of the valve sleeve 250 will provide highly desirable seal with the flow divider 230. At this time it is pointed out that although the illustrated projection 254 is of a right triangular cross section, the cross section will vary depending upon the number of the projections 254. The projections 254, when brought together, must form a complete circle.

It is pointed out here that although the valve sleeve has been illustrated as being of a cruciform configuration in its closed position, this configuration will vary depending upon the number of control arms provided for effecting the opening and closing of the valve sleeve. The number of control arms will normally correspond to the number of individual containers when a plurality of containers is being filled. However, it is feasible to utilize a number of control arms other than four and in certain instances two and three control arms will be more desirable than four while in other instances it may be desirable to use an even greater number of control arms.

Although only several preferred embodiments of the invention have been specifically illustrated and described herein, it is to be understood that other minor variations may be made in the disclosed filling apparatus within the spirit and scope of the invention, as defined by the appended claims.

I claim:

1. An apparatus for packaging a flowable material into a plurality of separable containers with the separable containers being arranged in units containing like weights of the material when filled, said apparatus comprising means for isolating a predetermined weight of the material, means for providing a plurality of containers to be filled, a valve for delivering and controlling the flow of weighed material from said isolating means into the containers, and means for dividing the flow of material through said valve as the material passes through said valve into substantially equal portions for delivery to individual ones of the containers.

2. An apparatus for packaging a flowable material into a plurality of separable containers with the separable containers being arranged in units containing like weights of the material when filled, said apparatus comprising means for isolating a predetermined weight of the material, means for providing a plurality of containers to be filled, valve means for providing a controlled differential pressure gaseous flow of the weighed material from said isolating means to the containers, and means for dividing the flow of material through said valve means as the material passes through said valve means into substantially equal portions for delivery to individual ones of the containers.

3. An apparatus for packaging a flowable material into a plurality of separable containers with the separable containers being arranged in units containing like weights of the material when filled said apparatus comprising means for isolating a predetermined weight of the material, means for providing a plurality of containers to be filled, and flow control means including valve means for delivering and controlling the flow of the weighed material from said material isolating means to the containers in substantially equal weights to each of the plurality of containers in a single material flow operation utilizing a flowing gas as a carrier for the weighed material.

4. An apparatus for packaging a flowable material into a plurality of separable packages with the separable packages being arranged in units containing like weights of the material, said apparatus comprising a weighing mechanism for isolating a predetermined weight of the material to be packaged, a flow control head for receiving weighed material from said weighing mechanism and means for positioning a plural container unit below said flow control head, said flow control head including a quick acting shut-off valve and a flow divider positioned in the path of material flowing through said valve.

5. The apparatus of claim 4 wherein said valve includes a resilient sleeve having a folded appearance when viewed in section and having a normal opening therethrough of a size lesser than an opening through said valve in a fully open position thereof, and valve control means for varying the folded cross section of said sleeve between a fully open position and a fully closed position.

6. The apparatus of claim 4 wherein said valve includes a resilient sleeve having a folded appearance when viewed in section and having a normal opening therethrough of a size lesser than an opening through said valve in a fully open position thereof, and valve control means for varying the folded cross section of said sleeve between a fully open position and a fully closed position, said valve control means including a plurality of swingable arms and an actuator for swinging said arms in unison.

7. A filling apparatus for use with flowable solids comprising a chamber, a valve for controlling the flow of solids out of said chamber, and means for effecting a gaseous flow through said chamber and said valve, said valve including a housing, means carried by said housing for sealed contact with a container, vent means in said housing and a filter covering said vent means, a valve sleeve having opposite ends thereof anchored against said housing, a plurality of valve sleeve position control arms pivotally mounted in said housing and a common actuator for simultaneously pivoting said arms, said valve including means for downwardly deforming the lower portion of said valve sleeve in the closed position thereof to compact solids dispensed through said valve and positioned within an associated container.

8. A filling apparatus for use with flowable solids comprising a chamber, a valve for controlling the flow of solids out of said chamber, and means for effecting a gaseous flow through said chamber and said valve, said valve including a housing, means carried by said housing for sealed contact with a container, vent means in said housing and a filter covering said vent means, a valve sleeve having opposite ends thereof anchored against said housing, a plurality of valve sleeve position control arms pivotally mounted in said housing and a common actuator for simultaneously pivoting said arms, said valve including means for downwardly deforming the lower portion of said valve sleeve and upwardly deforming the upper portion of said valve sleeve in the closed position thereof, said means being in the form of means for externally pressurizing said valve sleeve.

9. A flow control valve comprising a housing, a valve sleeve within said housing and defining a flow opening therethrough, opposite ends of said valve sleeve being anchored to said housing, a plurality of valve sleeve position control arms pivotally mounted in said housing around said valve sleeve, and a common actuator for all of said control arms, said valve sleeve having an initial folded configuration defining an opening when installed in said housing of a size lesser than that of the opening defined by said valve sleeve in its fully opened position with said valve sleeve containing sufficient material for movement between its fully opened and fully closed installed positions without material stretching.

10. A flow control valve comprising a housing, a valve sleeve within said housing and defining a flow opening therethrough, opposite ends of said valve sleeve being anchored to said housing, a plurality of valve sleeve position control arms pivotally mounted in said housing around said valve sleeve, each of said control arms having a gear segment, and a gear ring meshed with said gear segments to simultaneously pivot all of said control arms, said valve sleeve and said ring gear being sealed relative to said housing to define a sealed space surrounding said valve sleeve, and means for controlling the pressure within said sealed space to vary the cross sactional configuration of said valve sleeve.

11. A flow control valve comprising a resiliently deformable valve sleeve, a housing anchoring said valve sleeve at oppsite ends of said valve sleeve and defining a sealed area around said valve sleeve, mechanical means for changing the cross sectional outline of said valve sleeve between an open position and a closed position, and pressure differential means for varying the pressure in said sealed area to aid in the changing of the cross sectional outline of said valve sleeve, said mechanical means being fluid actuated, and a single valve controlling the operation of said mechanical means and said pressure differential means.

12. The flow control valve of claim 11 wherein said single valve includes means for venting said sealed area during the initial stage of the operation of said mechanical means whereby said pressure differential means in no way hinders the operation of said mechanical means.

13. A valve assembly comprising a pair of spaced valve units having a temporary material storage chamber therebetween, each of said valve units including a resiliently deformable valve sleeve, and means for moving central portions of said valve sleeves between open and closed positions, and a flow divider extending through said valve units and said chamber for providing independent flow passages through said valve units simultaneously controllable by said valve units.

14. A valve assembly comprising a pair of spaced valve units having a temporary material storage chamber therebetween, each of said valve units including a resiliently deformable valve sleeve, and means for moving central portions of said valve sleeves between open and closed positions, and a flow divider extending through said valve units and said chamber for providing independent flow passages through said valve units simultaneously controllable by said valve units, each of said valve units including a separate mechanical actuator for clamping the valve sleeve thereof against said flow divider in the closed position of the respective valve unit.

15. A valve assembly comprising a pair of spaced valve units having a temporary material storage chamber therebetween, each of said valve units including a resiliently deformable valve sleeve, and means for moving central portions of said valve sleeves between open and closed positions, and a flow divider extending through said valve units and said chamber for providing independent flow passages through said valve units simultaneously controllable by said valve units, said valve sleeves and said chamber being in continuous contact with said flow divider.

References Cited

UNITED STATES PATENTS

| | | | |
|---|---|---|---|
| 1,972,026 | 8/1934 | Miller | 141—68 X |
| 2,022,867 | 12/1935 | Middelboe et al. | 141—68 |
| 2,307,273 | 1/1943 | Hughes | 251—212 |
| 2,371,434 | 3/1945 | Eppler | 251—7 X |
| 2,936,994 | 5/1960 | Lau | 141—68 X |
| 2,949,713 | 8/1960 | Vogt | 53—191 X |
| 3,103,300 | 9/1963 | Lau | 141—67 X |
| 3,128,077 | 4/1964 | Lucky | 251—5 X |
| 3,235,064 | 2/1966 | Frost | 251—5 X |
| 3,187,957 | 6/1965 | Rose | 141—68 X |
| 3,063,477 | 11/1962 | Vogt | 141—5 |

FOREIGN PATENTS

| | | |
|---|---|---|
| 1,265,286 | 5/1961 | France. |
| 444,038 | 5/1927 | Germany. |
| 692,647 | 6/1953 | Great Britain. |
| 535,974 | 11/1955 | Italy. |
| 119,477 | 3/1927 | Switzerland. |
| 1,309,294 | 10/1962 | France. |
| 326,007 | 7/1919 | Germany. |
| 59,025 | 2/1938 | Norway. |
| 1,080,029 | 5/1954 | France. |

LAVERNE D. GEIGER, Primary Examiner

EDWARD J. EARLS, Assistant Examiner

U.S. Cl. X.R.

141—80, 83, 237; 222—450, 547; 251—9